Feb. 10, 1953   R. MUNRO   2,627,753
HERMETICALLY-SEALED SHAFT COUPLING
Filed Jan. 2, 1951   2 SHEETS—SHEET 1
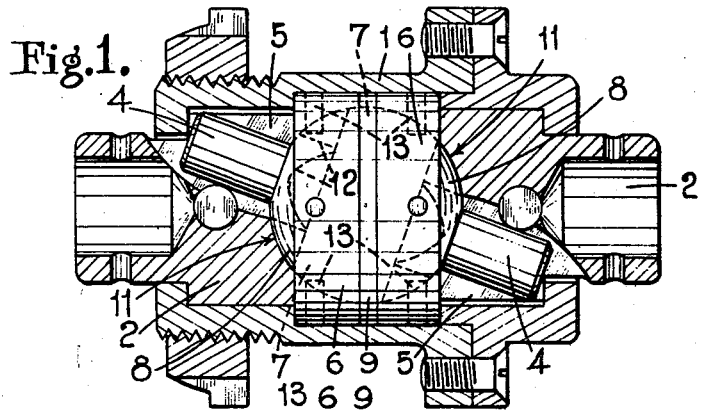
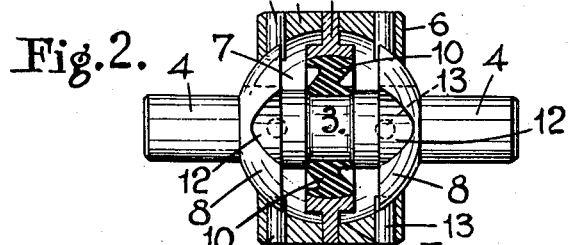
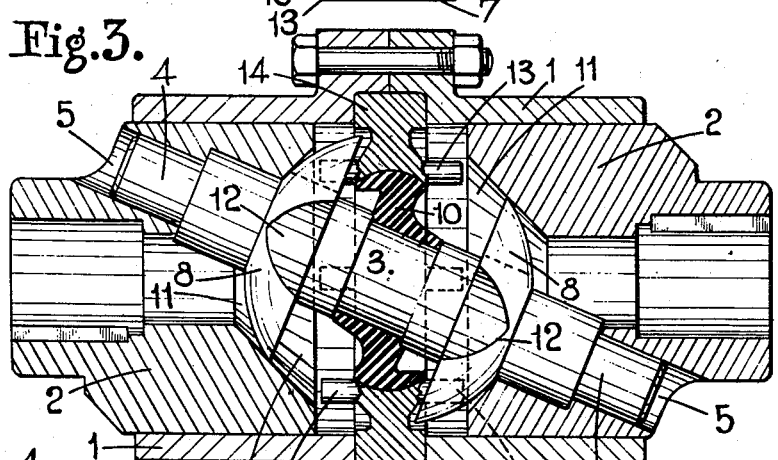
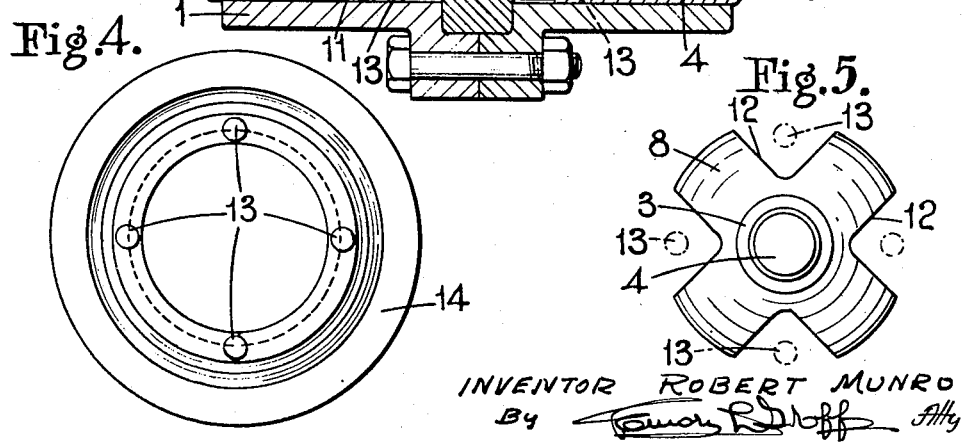
INVENTOR ROBERT MUNRO Feb. 10, 1953  R. MUNRO  2,627,753
HERMETICALLY-SEALED SHAFT COUPLING
Filed Jan. 2, 1951  2 SHEETS—SHEET 2
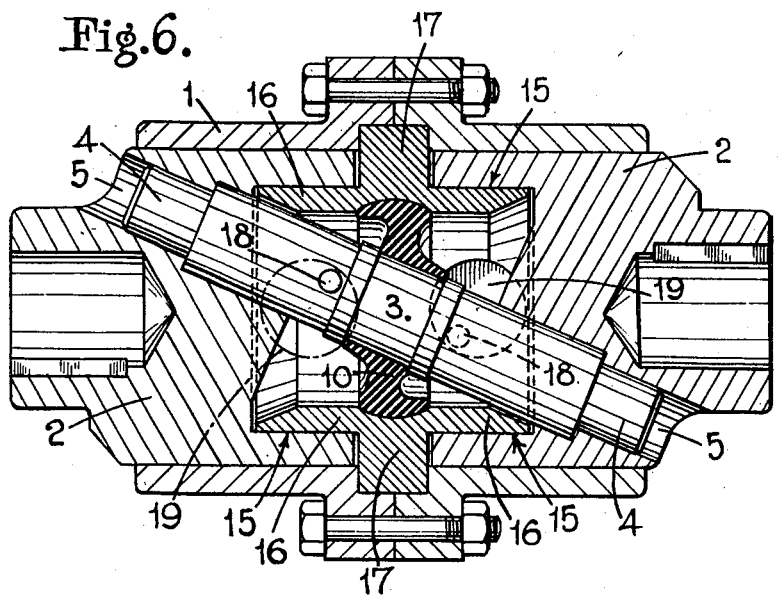
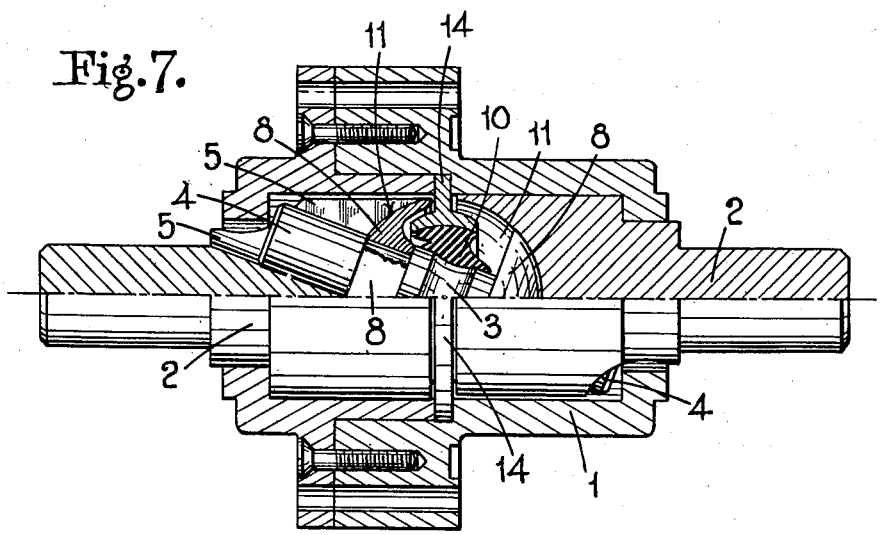
INVENTOR
ROBERT MUNRO Patented Feb. 10, 1953

2,627,753

UNITED STATES PATENT OFFICE 2,627,753

HERMETICALLY-SEALED SHAFT COUPLING

Robert Munro, Sunningdale, England

Application January 2, 1951, Serial No. 203,815
In Great Britain July 17, 1950

4 Claims. (Cl. 74—18.1)

This invention concerns improvements in hermetically-sealed couplings for connecting together rotary driving and driven elements such as a pair of co-axial shafts and of the kind in which a seal for air, gas or other fluid is formed at the coupling between the ends of the said shafts, the couplings being useful for miscellaneous apparatus, as for example pumps and compressors, in which the driven pump shaft is connected to a suitable driving shaft, or to an electric motor or other prime mover. The said invention is more particularly concerned with the known type of hermetic coupling of the foregoing kind in which the co-axial shaft ends are rotatably mounted within an outer casing and are connected by a wobble pin inclined to and crossing the common axis of the shafts, the ends of said pin being housed respectively in recesses such as slots or bores made in the opposed ends of the shafts, while the pin is secured at its middle to a flexible sealing diaphragm carried fixedly at its periphery by a casing in which the ends of the shafts are mounted. For convenience of interposing the coupling between a pair of shafts, the coupling includes a pair of co-axial dogs permanently assembled in the casing and adapted to be secured to the shafts; the dogs virtually constitute the shaft ends. In operation the pin does not rotate on its own axis, its middle being fixedly held in the diaphragm while each half of the pin generates a cone with the respective apices touching at the middle, the ends describing circles and moving around with the shaft ends, one driven and the other driving, similar to the well-known wobble-pin or swash-plate effect.

Difficulties are experienced in this type of coupling owing to the shaft ends (which phrase includes terminal dogs) misaligning and setting up excessive friction within the casing, and also due to the tendency of the connecting pin to rotate on its own axis. This latter can be overcome to a certain extent by mounting the pin ends in their respective shaft recesses with a degree of tolerance, but this, in turn, leads to additional play and back-lash between the shaft ends with consequential aggravation of the tendency to misalign.

The object of the invention is to eliminate this tendency to misalignment and consequent friction, this object being achieved mainly by hollowing the ends of shafts and adding an internal bearing therein thereby making the drive complementary to the aligning means and subsidiarily by employing supplemental means to restrain the tendency of the wobble pin to rotate on its own axis.

The invention will be fully understood from the following more detailed description of examples of couplings embodying the invention, with the aid of the accompanying drawings, in which—

Figure 1 is a vertical section of a complete coupling, according to one embodiment, the coupling unit proper being shown in outside elevation;

Figure 2 shows a vertical section of the coupling unit included in the Figure 1 embodiment;

Figure 3 is a vertical section of a second embodiment;

Figures 4 and 5 are face views of details of the Figure 3 embodiment hereinafter referred to;

Figure 6 is a vertical section of a third embodiment; and

Figure 7 is a vertical section of a fourth embodiment.

In all the embodiments there is an external casing 1 in which are mounted, in co-axial disposition, a pair of dogs 2 to each of which a shaft (not shown) is attached, one driving the other. A wobble pin 3 is fixed centrally to a resilient diaphragm 10 and is disposed in an inclined manner across the axis of the two dogs 2; the pin 3 is connected to the dogs by means of its ends 4 each of which lies in a recess formed as a slot or bore 5 in the end of its dog.

Referring to Figures 1 and 2, a pair of co-axial shafts (the driven and the driving) are adapted to be keyed or otherwise fixed to the pair of dogs 2 rotatably mounted in the external casing 1 with the coupling unit (Figure 2) hereinafter described mounted therebetween. These dogs 2 have a smooth running bearing in the casing 1 and are also supported internally by the coupling unit as will appear later, being thus retained in perfect axial alignment, while the liability to loss of efficiency or damage due to friction is reduced to a minimum.

Inserted between the ends of the dogs 2 within the casing 1 is the coupling unit comprising a pair of rings 6 which, when fitted together, form a cage having an internal spherical seating 7 for a wobble-pin ball made up of the two parts 8. These two rings 6 clamp between them a diaphragm or bonding ring 9 carrying a rubber or other flexible diaphragm 10. Through the centre of the diaphragm is passed the wobble-pin 3 which is sealed to the diaphragm at its middle. At each side of the diaphragm the pin is provided or formed with part of a ball (i. e. the aforesaid parts 8) which slides over the spherical surface 7 of the aforesaid cage. The ends 4 of the pin 3 extend outwardly from the respective centres of their ball parts 8 and constitute attaching elements for connecting the dogs 2 together. It will be seen that the pin can be rocked in all directions by flexing the diaphragm but it cannot be rotated on its own axis in relation to the diaphragm. In whatever position the pin is moved, a part of the ball surface 8 is always projecting from the cage at each side.

The two rotatable dogs 2 are spherically flared at 11 at their opposing ends so that they fit over the protruding ball surfaces 8 of the wobble-pin 3, and thus the dogs 2 have an internal bearing on the ball as well as an external bearing in the casing. In this embodiment, the dogs 2 are slotted on an inclined axle so that the projecting ends 4 of the wobble pin, continuing respectively from the said ball parts 8, can be mounted therein with the pin lying on an axis inclined to the common axis of the dogs. The two ball parts 8 on the wobble-pin may be recessed or cut away on their exterior slidable surfaces at four or other number equally spaced positions 12 for the reception of radially projecting retaining pins 13, one for each recess, projecting inwardly and immovably from the cage as shown, or outwardly from the bonding ring 9, so as to restrain the tendency of the pin 3 to rotate on its own axis.

In a somewhat similar embodiment shown in Figures 3 to 5 the aforesaid cage made up from the rings 6 is replaced by a single diaphragm or bonding ring 14 clamped in the casing, and the two ball parts 8 on the wobble-pin 3 slide solely in the flared mouths 11 of the dogs. In this case the retaining pins 13 which engage the recesses 12 in the ball parts 8 project longitudinally from the bonding ring 14, i. e. parallel to the common axis of the dogs 2. The bonding ring 14 with its pins 13 is shown by itself in Figure 4, and an end view of the pin with its ball part 8 is seen in Figure 5. The ball parts 8 in each of the foregoing embodiments may be fixed to or rotatably mounted on the wobble-pin 3.

Referring to Figure 6, the spherical or flared mouths 11 of the dogs 2 are shown replaced by cylindrical bores 15 into each of which is introduced an immovable sleeve 16 projecting from a single diaphragm or bonding ring 17. There are no ball parts in such a construction because the said sleeves 16 constitute journals for the internal bearings of the dogs. To restrain rotation of the wobble-pin, in this case, the pin 3 itself may be provided with one or more radially projecting pins 18 engaging holes or recesses 19 in the said journal sleeves 16.

Figure 7 shows another construction employing ball parts 8 acting as internal bearing elements for the flared openings 11 in the ends of the dogs, similarly to the constructions shown in Figures 1 and 2, and 3, 4 and 5. In this case the ball made up of the parts 8, 8 is always completely housed in the spherical recess made up of the two flared openings 11 and no pin devices or other means for independently restraining the rotation of the wobble-pin 3 on its own axis are employed.

The slot or bore 5 in the end of the dog 2 is not necessarily inclined to the axis of the dog as in all the examples illustrated. In a modification (not illustrated) of the Figure 7 construction, for example, the bore 5 is made parallel to and offset from the axis of the dog, opening into the spherically flared opening 11. This parallel bore 5 is made sufficiently large to receive the end 4 of the wobble pin on the incline, and the said end terminates in a ball-like protuberance to move smoothly in the said parallel bore 5.

In a further modification (not illustrated) the internal bearing member is a combination of the cylindrical sleeve 16 shown in Figure 6 and a ball part on the wobble pin 3 comparable to the part 8 of Figure 7.

Like numerals of reference indicate the same or corresponding parts throughout the various figures.

I claim:

1. A hermetically sealed coupling including an outer casing, a cylindrical bore at each end of the casing, a flexible diaphragm supported by a fixed carrier secured within the casing and sealing one cylindrical bore from the other, a pair of co-axial shaft ends rotatably mounted respectively within the casing cylindrical bores, a wobble pin passing through the diaphragm, inclined to and crossing the axis of the shaft ends and having its ends housed respectively in recesses made in the shaft ends, said flexible diaphragm being secured in a hermetically sealed manner to the middle of the wobble pin, and a pin-and-recess connection between the wobble pin and the fixed carrier to restrain rotation of the wobble pin on its axis.

2. A hermetically sealed coupling including an outer casing, a cylindrical bore at each end of the casing, a flexible diaphragm supported by a fixed carrier secured within the casing and sealing one cylindrical bore from the other, a pair of co-axial shaft ends rotatably mounted respectively within the casing cylindrical bores, a flared mouth formed in each of the opposed faces of said shaft ends, a wobble pin passing through the diaphragm, inclined to and crossing the axis of the shaft ends and having its ends housed respectively in recesses made in the shaft ends, said flexible diaphragm being secured in a hermetically sealed manner to the middle of the wobble pin, an internal bearing member in the form of a pair of ball parts carried by the wobble pin, said ball parts running respectively within the flared mouths of the shaft ends, and a pin-and-recess connection between the ball parts and the fixed carrier to restrain rotation on the wobble pin on its axis.

3. A hermetically sealed coupling including an outer casing, a cylindrical bore at each end of the casing a flexible diaphragm supported by a diaphragm ring clamped between a pair of outer rings secured within the casing, said outer rings together forming a cage having an internal spherical seating, the diaphragm sealing one cylindrical bore from the other, a pair of co-axial shaft ends rotatably mounted respectively within the casing cylindrical bores, a flared mouth formed in each of the opposed faces of said shaft ends, a wobble pin passing through the diaphragm, inclined to and crossing the axis of the shaft ends and having its ends housed respectively in recesses made in the shaft ends, said flexible diaphragm being secured in a hermetically sealed manner to the middle of the wobble pin, an internal bearing member in the form of a pair of ball parts carried by the wobble pin, said ball parts running respectively within the flared mouths of the shaft ends and the internal spherical seating of the said cage, and a pin-and-recess connection between the ball parts and the fixed carrier to restrain rotation of the wobble pin on its axis.

4. A hermetically sealed coupling including an outer casing, a cylindrical bore at each end of the casing, a flexible diaphragm supported by a fixed carrier secured within the casing and sealing one cylindrical bore from the other, a pair of co-axial shaft ends rotatably mounted respectively within the casing cylindrical bores, a flared mouth formed in each of the opposed faces of said shaft ends, a wobble pin passing through the diaphragm, inclined to and crossing the axis of the shaft ends and having its ends housed respectively in recesses made in the shaft ends, said flexible diaphragm being secured in a hermetically sealed manner to the middle of the wobble pin, an internal bearing member in the form of a pair of ball parts carried by the wobble pin, said ball parts running respectively within the flared mouths of the shaft ends, and being formed with a number of recesses, and a plurality of pins extending from the fixed carrier and engaging in said recesses to restrain rotation of the wobble pin on its axis.

ROBERT MUNRO.

REFERENCES CITED

The following references are of record in the file of this patent:

UNITED STATES PATENTS

| Number | Name | Date |
|---|---|---|
| 1,148,227 | Heeley | July 27, 1915 |
| 2,417,108 | Guibert et al. | Nov. 11, 1947 |

FOREIGN PATENTS

| Number | Country | Date |
|---|---|---|
| 15,172 of 1912 | Great Britain | Nov. 21, 1912 |
| 92,097 | Sweden | Apr. 21, 1938 |